Nov. 25, 1924.
D. H. GREY
1,517,114
SHOCK ABSORBING SPRING FOR VEHICLES
Filed Sept. 5, 1922
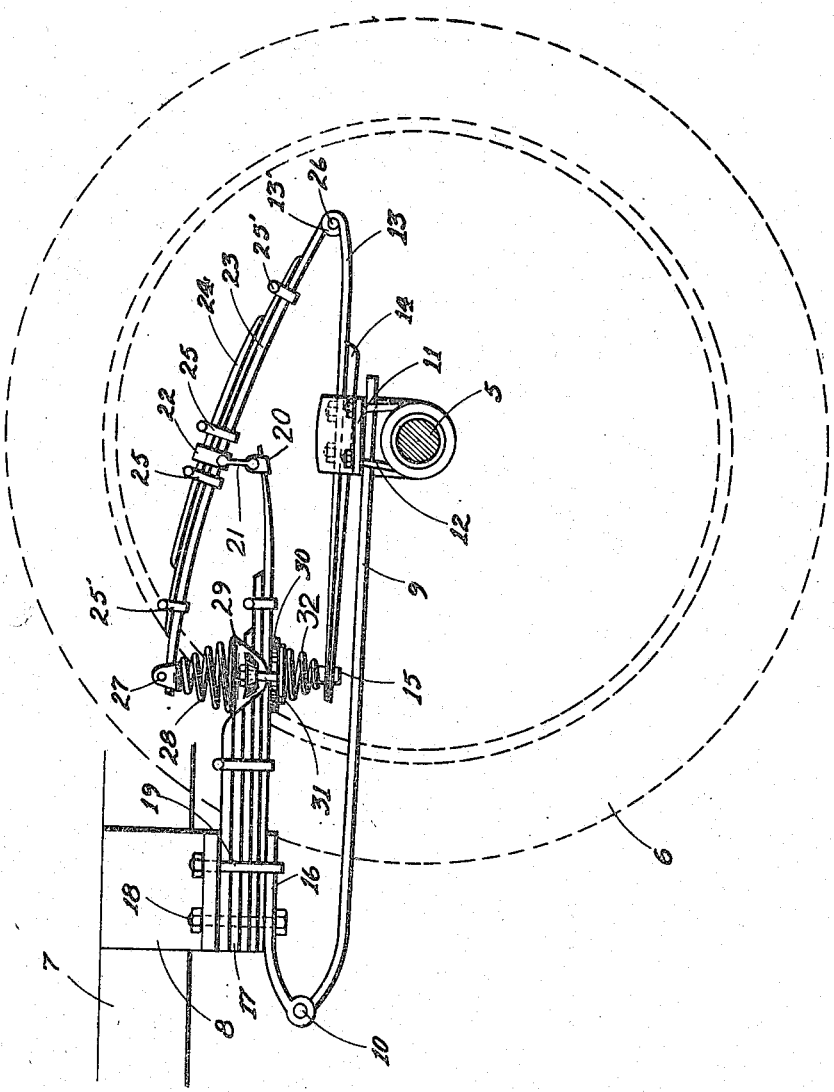
INVENTOR
*Dean Hawley Grey*
BY
*E. H. Bond*
ATTORNEY Patented Nov. 25, 1924.

1,517,114

UNITED STATES PATENT OFFICE.

DEAN HAWLEY GREY, OF ATHENS, ONTARIO, CANADA.

SHOCK-ABSORBING SPRING FOR VEHICLES.

Application filed September 5, 1922. Serial No. 586,298.

*To all whom it may concern:*

Be it known that I, DEAN HAWLEY GREY, a citizen of the Dominion of Canada, and resident of Athens, in the county of Leeds and Province of Ontario, Dominion of Canada, have invented certain new and useful Improvements in Shock-Absorbing Springs for Vehicles, of which the following is a specification.

This invention has relation to certain new and useful improvements in shock absorbing springs for vehicles and has for its primary object the provision of a spring of the character stated, which will be especially designed for use on motor vehicles and the like to absorb the shocks during the travel of the vehicle over uneven surfaces.

The invention has for another object the provision of a shock absorbing spring of the character stated, which will be of the bolster type mounted in such a manner between the vehicle axle and the body of the vehicle as to absorb the shocks received by the axle without permitting the body of the vehicle to be seriously affected thereby.

A further object of the invention resides in the provision of a shock absorbing spring of the character stated, which will be of such construction that one end portion will be mounted over the axle while the vehicle body is supported on the opposite end portion of the bolster spring, thereby permitting a substantial movement of the axle as the vehicle travels over rough surfaces without compelling a similar movement of the vehicle body.

The invention has for a further object the provision of a shock absorbing spring of the character stated which will be strong and durable and which will at the same time be constructed so as to yield readily and quickly and effectively absorb the shocks.

The invention has for a still further object the provision of a shock absorbing spring of the character set forth which will be of simple and inexpensive construction, composed of the minimum number of parts and which will be readily adapted to vehicles of various characters.

With the foregoing and other objects in view, as will appear as the description proceeds, the invention consists in the novel construction, combination and arrangement of co-operating elements as will be hereinafter more specifically set forth claimed and shown in the accompanying drawing, in which the spring is shown in elevation and connected with the axle and main frame of a vehicle, portions only of the vehicle being disclosed in the drawings.

Referring more in detail to the drawings, 5 designates a vehicle axle, preferably the rear axle and 6 a ground wheel carried by the vehicle axle 5 and indicated by dotted lines. A portion of the vehicle frame or chassis 7 is also disclosed with the outwardly directed bracket 8 carried thereby forwardly of the vehicle axle 5 and in a plane above the same.

The bolster spring includes a lower leaf 9 having its forward end turned upwardly slightly and connected with the hinge pin 10. The rear end portion of the lower leaf 9 is secured in the mounting bracket 11 clamped upon the vehicle axle 5, as shown at 12. A rearwardly directed lower leaf 13 is also extended through the mounting bracket 11 and supported on the reinforcing leaf 14. This rearwardly directed lower leaf 13 and reinforcing leaf 14 are spaced above the lower leaf 9. A bolt 15 is carried in the forward end of the rearwardly directed lower leaf 13 and extended through the reinforcing leaf 14. The purpose of the bolt 15 will presently appear.

Mounted on the hinge pin 10 is a short forward upper leaf 16. It will be understood that the forward extremity of the lower leaf 9 and the short forward upper leaf 16 are curved sufficiently toward one another to provide for a proper mounting thereof on the hinge pin 10 with the lower leaf 9 and short forward upper leaf 16 substantially parallel and spaced a considerable distance from one another. A plurality of laminated leaf spring members 17 are mounted on the short forward upper leaf 16 and extended rearwardly. These laminated leaf spring members 17 have their forward ends positioned beneath the outwardly directed bracket 8 and connected therewith by means of the straight bolt 18 extended through the outwardly directed bracket 8, through the laminated leaf spring members 17 and through the short forward upper leaf 16. A substantially U-shaped clamping bolt 19 is also extended through the outwardly directed bracket 8 and engaged around the laminated leaf spring members 17 and the short forward upper leaf 16.

The laminated leaf spring members 17 are of graduated length with their forward ends positioned in parallel relation. The longest or lower laminated leaf of the spring member 17 has its extended rear end secured in the collar 20 carrying the links 21. The links 21 are in turn pivoted to the sleeve 22 carried loosely on the rear upper leaf 23 and the laminated leaf spring members 24 mounted on the latter. The sleeve 22 is limited in its movement longitudinally on the rear upper leaf 23 and the laminated leaf spring members 24 by the leaf spring clamping members 25 which also serve as stop collars for the sleeve 22. Additional leaf spring clamping members 25' are provided on the rear upper leaf 23 and the laminated leaf spring members 24 near the ends thereof. The rear upper leaf 23 is mounted on the rear hinge pin 26 carried in the rear upturned end 13' of the rearwardly directed lower leaf 13.

The rear upper leaf 23 is extended forwardly on an incline over the rear ends of the laminated leaf spring members 17, the upper forward end of the rear upper leaf 23 being secured in the bracket member 27 carried on the upper small end of the conical expansion spring 28. The large lower end of the conical expansion spring 28 is carried on the supporting plate 29 mounted on the laminated leaf spring members 17 intermediate the ends thereof. A lower plate 30 is positioned beneath the laminated leaf spring members 17 opposite the supporting plate 29 and connected therewith by means of clamping screws 31 extended through said supporting plate 29 and lower plate 30. An inverted conical expansion spring 32 is secured by its large end to the lower plate 30 while its small lower end is secured to the bolt 15, previously mentioned. The conical expansion spring 28 forms the proper resilient connection between the central portion of the laminated leaf spring members 17 and the upper forward end of the rear upper leaf 23. The inverted conical expansion spring 32 forms a similar resilient connection between the central portions of the laminated leaf spring members 17 and the forward end of the rearwardly directed lower leaf 13.

The connection of the various elements as described, leaves the lower leaf 9 free to operate upon the vehicle axle 5 while the rearwardly directed lower leaf 13 also works upon the vehicle axle 5. All of the upper members have their pivotal actions on the forward lower leaf 9 through the medium of the forward hinge pin 10 and on the rearwardly directed lower leaf 13 through the medium of the rear hinge pin 26. It is also to be noted that the forward hinge pin 10 is located a considerable distance from the vehicle axle 5 while the rear hinge pin 26 is located only a short distance on the other side of the vehicle axle 5. The distance between the vehicle axle 5 and the rear hinge pin 26 should correspond to or be governed by the distance between the forward hinge pin 10 and the outwardly directed bracket 8 carried by the vehicle frame or chassis 7. This will be readily understood by referring to the drawing.

It is believed the complete construction and operation of the shock absorbing spring may now be apparent from the foregoing paragraphs taken in connection with the accompanying drawings without further detail description. It may be briefly stated, however, that the construction of the spring as set forth and the mounting of the rear portion of the spring as a whole on the vehicle axle 5, while the outwardly directed bracket 8 carried by the vehicle frame or chassis 7 rests on the forward portion of the shock absorbing spring structure, causes all of the spring members of the structure to share the shock and distribute the same over the entire spring structure without subjecting the vehicle frame or chassis 7 to any appreciable portion of the original shock received by the ground wheel 6 and vehicle axle 5, when the vehicle is travelling over an uneven surface. The mounting of the spring structure as disclosed permits the forward lower leaf 9 and rearwardly directed lower leaf 13 to give either independently or together on the vehicle axle 5 whenever required during movement of the vehicle over rough surfaces.

The shock absorbing spring structure provides a number of different points of pivotal movement, such as the hinge pins 10 and 26 and the pivoted connected links 21 between the laminated leaf spring members 17 and the rear upper leaf 23. These points are in addition to the points of mounting of the spring structure on the vehicle axle 5 and the outwardly directed bracket 8.

The conical expansion springs 28 and 32 also serve to resiliently retain the various leaf members of the structure in proper spaced relation, the entire leaf spring structure representing conventionally two V-shaped members opposed to one another and each having one leg extended inwardly between the diverging legs of the other V-shaped member and the legs of one of said V-shaped members resiliently connected at their ends with the intermediate portion of the leg extended therebetween. When considered in this manner, it may be stated that the forward V-shaped member is of elongated form and serves as the member by which the vehicle body or chassis is supported on the vehicle axle while the other V-shaped member is mounted on the axle and serves to resiliently support the leg of the V-shaped member on which the vehicle frame or chassis rests. It should now be apparent to parties familiar with this art that the spring structure disclosed herein will effectively absorb all shocks due to travel of the ground wheel over uneven surfaces, the entire shock being properly distributed over the entire spring structure without any sudden or appreciable shock to the vehicle frame or chassis. It is believed further description is unnecessary.

While the preferred embodiment of the invention has been disclosed, it is to be understood that minor changes in the details of construction, combination and arrangement of co-operating elements may be resorted to within the scope of what is claimed without departing from the spirit of the invention.

What I claim as new is:

1. A shock absorbing spring structure comprising overlapping forward lower and rear lower leaf members; a forward upper leaf member hinged to the forward lower leaf member; cantilever spring members mounted on said forward upper leaf member and having rigid connection with the frame; a rear upper leaf member hinged to said rear lower leaf member; said forward lower and rear lower leaf members being mounted in spaced relation on a vehicle axle; means for mounting the vehicle chassis on said cantilever spring members; resilient connections between said rear lower leaf member and said cantilever spring members; resilient connections between said cantilever spring members and said rear upper spring member; and an additional loose connection between said cantilever leaf spring members and said rear upper leaf spring member.

2. A shock absorbing structure comprising overlapping forward lower and rear lower leaf members; a forward upper leaf member hinged to said forward lower leaf member; cantilever spring members of graduated length secured upon said forward upper leaf member and extended rearwardly over said forward lower and rear lower leaf members; means for mounting said forward lower and rear lower leaf members on a vehicle axle; means for securing the vehicle chassis on said cantilever spring members; a rear upper leaf member hinged to said rear lower leaf member at the rear end of the latter; a link connection between said rear upper leaf member and the extended cantilever spring members at a point substantially above the vehicle axle; resilient connections between the forward end of the rear lower leaf member and said cantilever spring members; and resilient connections between said cantilever spring members and the forward end of said rear upper leaf member.

3. A shock-absorbing spring structure comprising a frame, a cantilever spring, having a rigid connection with the frame and having a lower leaf pivotally attached thereto and extending rearward to the axle, a cooperating shock absorbing attachment consisting of spring leaves pivoted rearwardly of the axle and extending above and below the cantilever spring and connected thereto, and cooperating shock absorbing springs above and below the cantilever spring.

In testimony whereof, I affix my signature.

DEAN HAWLEY GREY.